(12) United States Patent
Kutscher et al.

(10) Patent No.: US 9,193,319 B2
(45) Date of Patent: Nov. 24, 2015

(54) MOTOR VEHICLE BUMPER WITH AN INTEGRATED PEDESTRIAN PROTECTION SYSTEM

(75) Inventors: Matthias Kutscher, Constance (DE);
Thomas Rebstock, Hilzingen (DE);
Olivier Rebuffet, Grenoble (FR);
Wilhelm Riedl, Pfaffenhofen (DE);
Gerhard Fichtinger, Grasbrunn' (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 0 days.

(21) Appl. No.: 13/982,859

(22) PCT Filed: Feb. 6, 2012

(86) PCT No.: PCT/EP2012/000528
§ 371 (c)(1),
(2), (4) Date: Nov. 14, 2013

(87) PCT Pub. No.: WO2012/110208
PCT Pub. Date: Aug. 23, 2012

(65) Prior Publication Data
US 2014/0070554 A1      Mar. 13, 2014

(30) Foreign Application Priority Data

Feb. 16, 2011   (DE) .................... 10 2011 004 197

(51) Int. Cl.
*B60R 19/18*   (2006.01)
*F16F 7/12*    (2006.01)

(52) U.S. Cl.
CPC . *B60R 19/18* (2013.01); *F16F 7/12* (2013.01); *B60R 2019/182* (2013.01)

(58) Field of Classification Search
CPC .... B60R 19/18; B60R 19/34; B60R 2019/182
USPC ............... 296/187.04, 187.03; 293/120, 122, 293/132.133, 102, 110
See application file for complete search history.

(56) References Cited

U.S. PATENT DOCUMENTS 3,843,182 A * 10/1974 Walls et al. .................. 293/122
3,844,544 A * 10/1974 Keilholz .................... 267/64.22
(Continued)

FOREIGN PATENT DOCUMENTS

CN         1498799 A     5/2004
CN       201670190 U    12/2010
(Continued)

OTHER PUBLICATIONS

International Search Report mailed Jan. 6, 2012, corresponding to PCT/EP2012/000528.
(Continued)

*Primary Examiner* — Pinel Romain
(74) *Attorney, Agent, or Firm* — Ladas & Parry LLP

(57) ABSTRACT

A motor vehicle bumper with a crossmember (1) in channel form and a front element (2), which is mounted in front of said crossmember and is in channel form, said crossmember and front element together forming a pedestrian protection system, characterized in that, in the assembled state, the front element (2) has a greater overall height (h2) than the crossmember (1), and the rear part (3a, 3b), which faces the crossmember, of the upper and lower wall regions of said front element are inclined from the horizontal towards the crossmember (1).

29 Claims, 1 Drawing Sheet

(56) References Cited

U.S. PATENT DOCUMENTS

Figure 1:
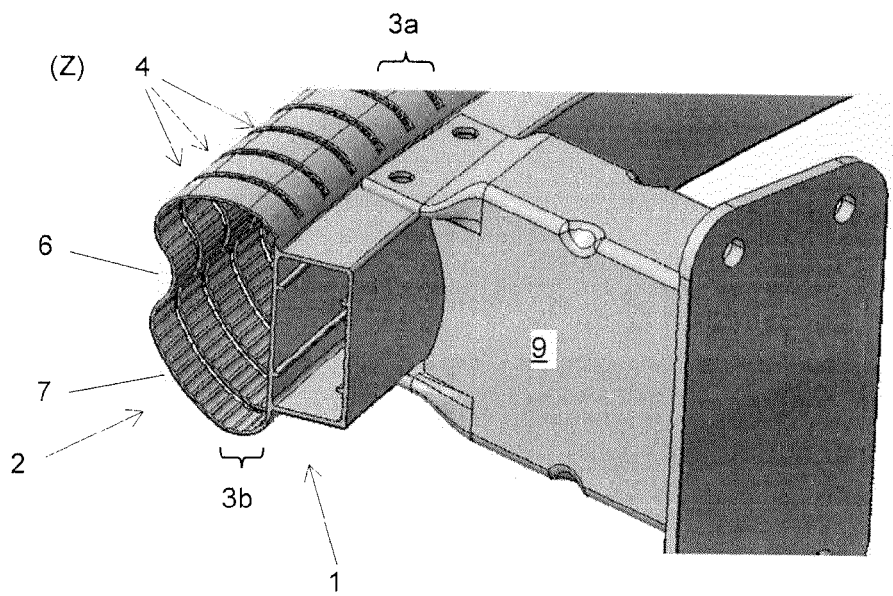

| | | | |
|---|---|---|---|
| 3,938,840 A * | 2/1976 | Haase et al. | 293/110 |
| 4,050,689 A * | 9/1977 | Barton et al. | 293/110 |
| 4,072,334 A * | 2/1978 | Seegmiller et al. | 293/110 |
| 4,088,357 A | 5/1978 | Klie et al. | |
| 4,421,351 A * | 12/1983 | Bruhnke et al. | 293/132 |
| 4,542,925 A * | 9/1985 | Huber et al. | 293/120 |
| 4,702,515 A * | 10/1987 | Kato et al. | 296/187.01 |
| 4,756,948 A * | 7/1988 | Kuramochi et al. | 428/167 |
| 5,106,137 A * | 4/1992 | Curtis | 293/107 |
| 5,425,561 A * | 6/1995 | Morgan | 293/120 |
| 6,082,792 A | 7/2000 | Evans et al. | |
| 6,308,999 B1 * | 10/2001 | Tan et al. | 293/109 |
| 6,428,064 B1 * | 8/2002 | Frederick | 293/120 |
| 7,407,219 B2 * | 8/2008 | Glasgow et al. | 296/187.03 |
| 7,575,271 B2 * | 8/2009 | Hasegawa et al. | 296/187.04 |
| 7,874,600 B2 * | 1/2011 | Hashimura | 293/102 |
| 7,938,463 B2 * | 5/2011 | Lee | 293/120 |
| 7,992,905 B2 * | 8/2011 | Kusche et al. | 293/133 |
| 8,104,805 B2 * | 1/2012 | Suzuki et al. | 293/132 |
| 8,585,106 B2 * | 11/2013 | Gukkenberger et al. | 293/109 |
| 2002/0047281 A1 | 4/2002 | Hartel et al. | |
| 2005/0082853 A1 * | 4/2005 | Wallman | 293/133 |
| 2009/0152883 A1 * | 6/2009 | Lee | 293/120 |
| 2009/0206618 A1 * | 8/2009 | Ralston et al. | 293/120 |
| 2009/0267368 A1 | 10/2009 | Hashimura | |

FOREIGN PATENT DOCUMENTS

| | | |
|---|---|---|
| DE | 2440708 A1 | 3/1976 |
| DE | 4307837 A1 | 9/1993 |
| DE | 19519110 A1 | 12/1995 |
| DE | 60206255 T2 | 6/2006 |
| DE | 102008047203 A1 | 4/2010 |
| DE | 10201003159 A1 * | 7/2010 |
| EP | 1378403 B1 | 1/2004 |

OTHER PUBLICATIONS

European Office Action dated May 27, 2015 corresponding to European Patent Application No. 12703454.4; with English language translation.

* cited by examiner

MOTOR VEHICLE BUMPER WITH AN INTEGRATED PEDESTRIAN PROTECTION SYSTEM

This application is a 371 of PCT/EP2012/000528, filed on Feb. 6, 2012, which claims priority to German Application No. DE 10 2011 004 197.4, filed Feb. 16, 2011.

The present invention relates to a motor vehicle bumper with a crossmember in channel form and a front element, which is mounted in front of said crossmember and is in channel form, said crossmember and front element together forming a pedestrian protection system.

Such pedestrian protection systems are known in the prior art. They serve to alleviate for the pedestrian the consequences of a collision between a pedestrian and a motor vehicle by the deceleration peak values on impact of the motor vehicle onto the leg of a pedestrian being reduced. This is achieved in that the front element mounted in front of the crossmember of the bumper is deformable with lower forces than the crossmember situated behind it, viewed in the direction of travel. Through the deformation of the front element over its entire depth starting from its front side to close to the front side of the crossmember, the peak is taken from the deceleration impulse, because the application of force is extended chronologically.

From DE 10 2007 039 211 A1 a motor vehicle bumper is known in accordance with the introductory clause of claim 1. This bumper has a crossmember with rectangular cross-section with a wall thickness of for example 3 to 6 mm. Constructed in front of it is a front element, likewise with rectangular cross-section, however with a considerably smaller wall thickness of for example 0.2 to 0.8 mm. The front element has a smaller overall height than the crossmember and its upper side and lower side extend, starting from the crossmember, horizontally toward the front. This alignment of the upper and lower sides of the front element in the direction of travel impedes the deformation of the front element at the start of a collision with a pedestrian. Allowance is made for this circumstance according to this publication by deformation-promoting edge profiles, in particular in the form of drawn-in or curved-in profile regions, being provided.

In such an embodiment of a pedestrian protection system it is disadvantageous that through the small overall height of the front element the impact area of the pedestrian protection system onto the leg of a pedestrian is relatively small and also does not become larger during the deformation. Thereby, the impact forces are concentrated locally onto a small region of the body of the pedestrian, which can not lessen the severity of the injuries which are to be expected.

Furthermore, through the required very small wall thickness of the front element, the extrusion method proves to be difficult.

It is an object of the present invention to present a motor vehicle bumper with an integrated pedestrian protection system which has an improved deformability on collision with a pedestrian and which is able to be produced with less effort, whereby its costs are reduced.

This problem is solved by the features of claim 1. Features of preferred embodiments of the invention are characterized in the subclaims.

The subject of the present invention is therefore a motor vehicle bumper with a crossmember in channel form and a front element which is mounted in front of said crossmember and is in channel form, said crossmember and front element together forming a pedestrian protection system. The bumper according to the invention is characterized in that in the assembled state, the front element has a greater overall height than the crossmember, and the rear part, which faces the crossmember, of the upper and lower wall regions of said front element are inclined from the horizontal, which corresponds to the direction of travel, towards the crossmember.

Preferably, each upper or lower wall region is inclined in its rear part facing the crossmember in a contact site towards the crossmember, where the angle formed by this (crossmember) and the horizontal is between 60° and 180°, preferably between 80° and 120°, and particularly preferably is approximately 90°.

In other words, each end of the rear, upper and lower wall regions of the front element meets onto the crossmember in a contact site where it forms an acute angle with the vertical originating from the outer side of the crossmember. The acute angle can be positive or negative, i.e. the upper and lower wall regions of the front element can be inclined toward the front or toward the rear in the vicinity of the linking site with the crossmember. When the wall region is inclined toward the front, the angle must be less than 30°, in order to give the front element a better flexibility. Advantageously, the absolute value of this angle is less than 30°, particularly preferably less than 10°. In especially preferred embodiments of the invention, this angle is approximately zero degrees.

Preferably, the crossmember has upper and lower front edges, and the front element meets with its upper and lower rear wall regions on these upper and lower front edges onto the crossmember.

In a preferred embodiment of the invention, the crossmember has an approximately rectangular profile in cross-section, with an approximately vertical rear wall connected with the carrier elements, a front wall likewise running approximately vertically, and transverse walls lying one over another, running approximately horizontally. The rear part, facing the crossmember, of the upper (or respectively lower) wall region of the front element meets onto the upper (or respectively lower) transverse wall of the crossmember in an acute angle with respect to the vertical (Na, or respectively Nb) originating from the outer side of the crossmember.

Preferably, the parts, facing the crossmember, proceeding from the horizontal are inclined towards a transverse wall of the crossmember with an angle becoming continuously smaller with respect to the vertical originating from the outer side of the crossmember. In other words, the rear parts, facing the crossmember, of the upper (or respectively lower) wall region of the front element run from an outermost upper end, or respectively outermost lower end, to a linking site where the tangents at each point and the vertical originating from the transverse wall of the crossmember form an angle which decreases continuously.

Preferably, the crossmember has a greater wall thickness than the front element. Furthermore, the front element can have a cross-section where the wall thickness is position-dependent. Thus, we can design thick wall regions, approximately perpendicular to the direction of travel, which are connected with thinner, more easily deformable wall regions. The front wall region of the front element can therefore be thicker than the upper wall region and the lower wall region, which is advantageous in the case of an extruded multi-chamber hollow profile, because this hollow profile is thereby able to be produced more easily.

According to a preferred embodiment of the invention, the crossmember and the front element are produced in one piece from an aluminium alloy by an extrusion method. The crossmember and the front element form, for example, the rear part and the front part of an extruded hollow profile.

Generally, the bumper has a curved shape. The hollow profile must therefore often be bent. As the front element is thinner than the crossmember, it could be deformed too intensively or even collapse. In order to reduce this deformation, preferably a profile is used which has a discontinuous "intake side" (i.e. the front part of the front element, which is expanded during the bending). It is therefore recommended to produce notches or slots on this front part of the front element by milling or punching, at least in the central region of the bumper. The central region of the bumper is situated between its clamps, which are arranged in the extension of the longitudinal beam of the vehicle. In this way, the cross-section of the pedestrian protection system formed with the crossmember and the front element remains substantially constant, at least in this central region of the bumper. Preferably, these notches or slots run perpendicularly in the front element.

Through the provision of these slots, it is also achieved that in the collision with a pedestrian's leg, only the regions of the front element are deformed against which the leg impacts. Thereby, the front element becomes more easily deformable in the impact region and deceleration peaks are lessened.

The slots can have various shapes, wherein some promote the bending strength of the front element, others improve the deformability of the front element during the collision.

The slots can extend from the upper, rear wall region up to the lower, rear wall region of the front element. Advantageously, the slots terminate with a distance of several millimetres (e.g. 5 mm) before the meeting of the upper and lower rear wall regions of the front element on the crossmember.

Advantageously, the slots have a width in the order of one to several millimetres.

In the following example, the slots have the same distance and are arranged distributed over the entire length of the front element. In other embodiments of the invention, the notches or slots are punched by a stylus, the cross-section of which is shaped such that the resulting recesses have a variable width. Advantageously, the ends of the slots terminate into round holes, the diameter of which is preferably greater than the width of these slots.

Advantageously, the front element has in its frontal wall region an indentation, drawn in towards the rear, which extends over its entire length.

According to a preferred embodiment of the present invention, the front element has on the inner side of its wall a profile which is ribbed in the direction of the longitudinal axis of the front element.

According to a preferred embodiment, the front element has in the troughs of the ribbing a wall thickness of approximately 1 mm and on the ridges of the ribbing a wall thickness of approximately 1.4 mm.

According to a preferred embodiment of the present invention, the cross-sectional profile of the front element is symmetrical with respect to its horizontal centre axis.

Advantageously, deformation- and/or acceleration sensors and/or distance sensors can be mounted on the inner walls of the front element.

Advantageously, the front element has in cross-section at every point a greatest possible radius of curvature.

Figure 2:
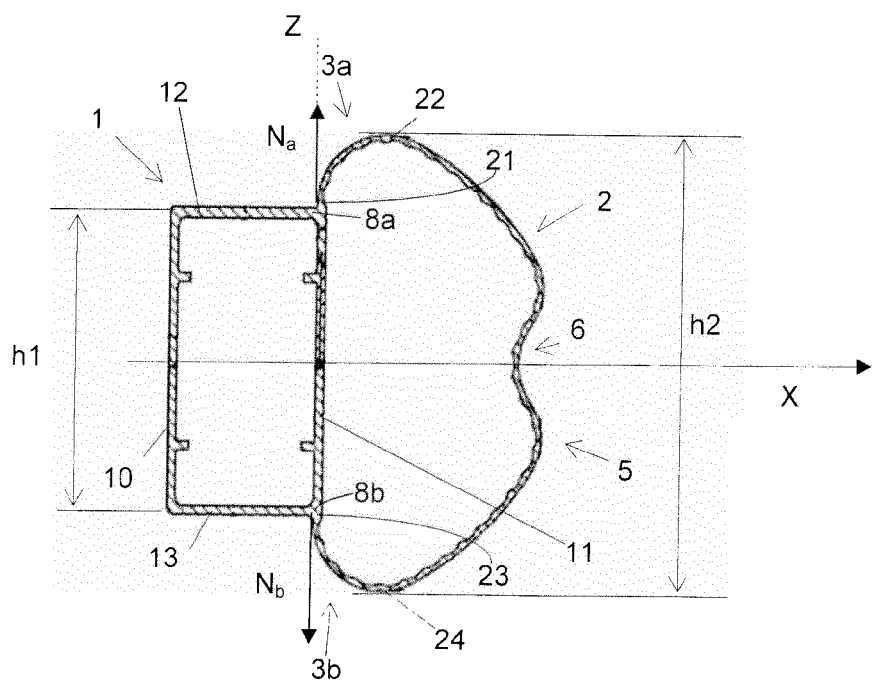

The invention is explained in further detail below with the aid of the description of a preferred embodiment with reference to the drawings. There are shown therein:

FIG. 1 a perspective view of an example embodiment of the bumper with pedestrian protection system according to the invention; and FIG. 2 a cross-section through the bumper shown in FIG. 1.

FIG. 1 shows perspectively, viewed in the direction of travel obliquely from the rear, an example embodiment of a bumper according to the invention.

This has a crossmember 1 with a rectangular cross-section, which is screwed to a carrier element 9. The crossmember 1 has a vertical rear wall 10 connected with a carrier element 9, a vertical front wall 11 and two transverse walls 12 and 13 running horizontally, lying one over another and spaced apart with the overall height h1. The carrier element 9 is (not shown) in turn connected with a longitudinal beam or suchlike of the chassis of the motor vehicle. The crossmember is preferably produced from an aluminium alloy and has a wall thickness of preferably 2 mm or more.

A front element 2 is mounted in front of the crossmember 1, viewed in the direction of travel. In the embodiment which is shown here, the front element 2 is embodied in a single piece with the crossmember 1. It is produced together with the crossmember 1 in a two-chamber extrusion method.

As can be seen clearly in FIG. 2, the front element 2 has an overall height h2 which is greater than the overall height h1 of the crossmember 1. This means that the front element 2 in the assembled state projects both above and below with respect to the crossmember 1. In this preferred embodiment, the overall height h2 is the distance between the outermost upper end 22 and the outermost lower end 24.

The upper, rear wall region 3a of the front element 2, which extends from the outermost upper end 22 to the linking site 21, and the lower, rear wall region 3b of the front element 2, which extends from the outermost lower end 24 to the linking site 23, are inclined from the horizontal with a large radius of curvature towards the upper or respectively lower front edge 8a or respectively 8b. There, at the front edges 8a, 8b they meet onto the upper side or respectively onto the lower side of the crossmember 1. This means they assume at the contact site an angle of zero degrees to the outward normals Na or respectively Nb, which are vertical here. This incidence angle can also be somewhat greater than zero degrees.

This configuration of the front element 2 has the effect that in a collision with a pedestrian the front element 2 can be deformed more easily at the upper and lower edges 8a, 8b of the crossmember 1 than if the upper and lower side of the front element 2 extended horizontally in the direction of travel.

The maximum deformation path of the front element 2 is optimal in a collision because a deformation can take place until the front side 5 of the front element 2 lies on the front side of the front wall 11 of the crossmember 1. The upper, rear wall region 3a and the lower, rear wall region 3b of the wall of the front element 2 are deformed and displaced towards the rear here beyond the front edges 8a, 8b contrary to the direction of travel.

In this way, the depth of the front element 2 in X-direction is utilized optimally for the maximum available deformation path. As already mentioned above, a great deformation path is important for the chronological extending of the application of force. Therefore, according to the invention either the occurring deceleration peaks can be further attenuated, or the structural depth of the front element 2 can be reduced, which leads to a more compact structural form of the bumper with pedestrian protection system.

On the front side 5 in the embodiment of the front element 2 which is shown, an indentation 6 is provided in the wall of the front element 2, which extends in the form of a groove over the entire length of the front element 2. The indentation 6, viewed in cross-section, is provided with large radii of curvature, so as not to create any unnecessary potential for injury. The front side of the front element 2 is reinforced somewhat by the indentation 6, in order to concentrate the deformations of the front element 2 more intensively onto the upper and lower regions of the wall of the front element 2 in a collision.

As can be seen in FIG. 1, vertically-running slots are provided in the front element 2, spaced apart equally respectively along the entire longitudinal extent of the front element 2. The vertical slots 4, which can have a width in the order of one millimetre, begin in the upper, rear region 3a of the front element 2 and terminate in the lower, rear region 3b, without reaching up to the front edges 8a, 8b of the crossmember 1. The webs which are thereby formed between the slots 4 can have a width in the order of one or several centimetres. By the provision of the slots 4 it is achieved that in the collision with a pedestrian's leg, only the regions of the front element 2 are deformed against which the leg impacts. Thereby, the front element 2 is more easily deformable in the impact region and deceleration peaks are lessened.

In addition, the deformability of the walls of the front element 2 can be influenced positively by the inner side of the wall being ribbed. This takes place through a corresponding configuration of the extrusion tool. It is preferred that the ribbing has an undulating shape in cross-section. The wall thickness of the front element 2 here in the "ribbing troughs" is preferably approximately 1 mm, whereas it is preferably 1.4 mm in the region of the "ribbing ridges". Through the ribbing 7 a buckling of the strips between the slots 4 in the impact region of the pedestrian's body is facilitated, which would otherwise only be possible with considerably thinner wall thicknesses of the front element 2. Considerably thinner wall thicknesses are, however, more difficult to realize in the extrusion method, whereby therefore the production is facilitated.

Finally, the cavity formed by the front element 2 can be equipped in addition with sensors on the inner wall of the front side of the front element 2, such as for example deformation- and/or acceleration sensors and/or distance sensors.

The present invention therefore presents a bumper with an integrated pedestrian protection system, which has an improved deformation behaviour, which is to be produced in a simplified manner and therefore constitutes a favourably-priced solution.

The above description of an example embodiment is not to be understood as being restrictive. Rather, the invention includes all conceivable variants which fall within the wording of the enclosed claims. Thus, for example, the crossmember 1 can assume any suitable cross-sectional shape and also the cross-sectional shape of the front element 2 can deviate from the shape which is shown, as long as its overall height is greater than that of the crossmember 1 and as long as the walls of the front element 2 meet onto the crossmember 1 perpendicularly or with a small angle to the perpendicular.

The invention claimed is:

1. A motor vehicle bumper forming a pedestrian protection system, said bumper comprising:
   a crossmember in channel form, said crossmember having a horizontal axis, front and rear walls, and upper and lower walls; and
   a deformable front element in channel form mounted on said crossmember;
   wherein the front element comprises upper and lower rear wall regions facing the crossmember;
   wherein, in a non-deformed state, the front element has a greater overall height than the crossmember;
   wherein the upper and lower rear wall regions of the front element are inclined towards the crossmember at an angle with respect to the horizontal axis of the crossmember.

2. The bumper according to claim 1, wherein the upper and lower rear wall regions are inclined towards the crossmember at an angle of from 60° to 180° with respect to the horizontal axis of the crossmember.

3. The bumper according to claim 2, wherein the angle is from 80° to 120°.

4. The bumper according to claim 2, wherein the angle is approximately 90°.

5. The bumper according to claim 1,
   wherein the crossmember has an approximately rectangular profile in cross-section;
   wherein the front and rear walls of the crossmember are approximately perpendicular to the horizontal axis of the crossmember;
   wherein the upper and lower walls of the crossmember are approximately parallel to the horizontal axis of the crossmember.

6. The bumper according to claim 1, wherein the upper and lower wall regions of the front element meet a contact site on the crossmember at an acute angle with respect to the front wall of the crossmember.

7. The bumper according to claim 6, wherein the acute angle is less than 30°.

8. The bumper according to claim 6, wherein the acute angle is less than 10°.

9. The bumper according to claim 6, wherein the acute angle is approximately zero degrees.

10. The bumper according to claim 1,
    wherein the crossmember comprises upper and lower edges facing the front element;
    wherein the upper rear wall region of the front element contacts the upper edge of the crossmember; and
    wherein the lower rear wall region of the front element contacts the lower edge of the crossmember.

11. The bumper according to claim 1,
    wherein the upper rear wall region of the front member is inclined towards the front wall of the crossmember with an angle becoming continuously smaller with respect to a vertical plane of the front wall; and
    wherein the lower rear wall region of the front member is inclined towards the front wall of the crossmember with an angle becoming continuously smaller with respect to the vertical plane of the front wall.

12. The bumper according to claim 1, wherein the crossmember has a greater wall thickness than the front element.

13. The bumper according to claim 12, wherein the wall thickness of the front element is variable across the length of the crossmember.

14. The bumper according to claim 12, wherein thick wall regions, approximately perpendicular to the direction of travel, are connected with thinner, more easily deformable wall regions.

15. The bumper according to claim 1, wherein the crossmember and the front element are manufactured from aluminum alloy in one piece using an extrusion method.

16. The bumper according to claim 15, wherein the crossmember and the front element form a rear part and a front part, respectively, of an extruded hollow profile.

17. The bumper according to claim 16 wherein a cross-section of the bumper is substantially constant at least in a central region of the bumper.

18. The bumper according to claim 1, wherein the front element comprises a plurality of vertical slots.

19. The bumper according to claim 18, wherein the slots extend longitudinally from the upper rear wall region to the lower rear wall region of the front element.

20. The bumper according to claim 19, wherein upper and lower ends of the slots terminate before the upper and lower rear wall regions contact the crossmember.

21. The bumper according to claim 18, wherein the slots have a width in the order of 1 to several millimeters.

22. The bumper according to claim 18, wherein the slots are spaced equidistantly from each other and are distributed over an entire length of the front element.

23. The bumper according to claim 1, wherein a front wall region of the front element comprises an indentation extending horizontally along the entire length of the crossmember.

24. The bumper according to claim 1, wherein an inside surface of the front element comprises a plurality of longitudinal ribs.

25. The bumper according to claim 1, comprising at least one of a deformation sensor, an acceleration sensor, and a distance sensor.

26. The bumper according to claim 25, wherein the at least one sensor is mounted inside the front element.

27. The bumper according to claim 1, wherein the front element has in cross-section at every point a greatest possible radius of curvature.

28. The bumper according to claim 1, wherein said crossmember at connected to a carrier element.

29. A motor vehicle bumper forming a pedestrian protection system, said bumper comprising:
- a crossmember in channel form, said crossmember having a horizontal axis, front and rear walls, and upper and lower walls; and
- a deformable front element in channel form mounted on said crossmember;
- wherein the front element comprises upper and lower rear wall regions facing the crossmember;
- wherein, in an non-deformed state, the front element has a greater overall height than the crossmember;
- wherein the upper and lower rear wall regions of the front element are inclined towards the crossmember at an angle with respect to the horizontal axis of the crossmember;
- wherein an inside surface of the front element comprises a plurality of longitudinal ribs;
- wherein the ribs form troughs and ridges;
- wherein the troughs have a wall thickness of approximately 1 mm, and
- wherein the ridges have a wall thickness of approximately 1.4 mm.

* * * * *